Figure 1:
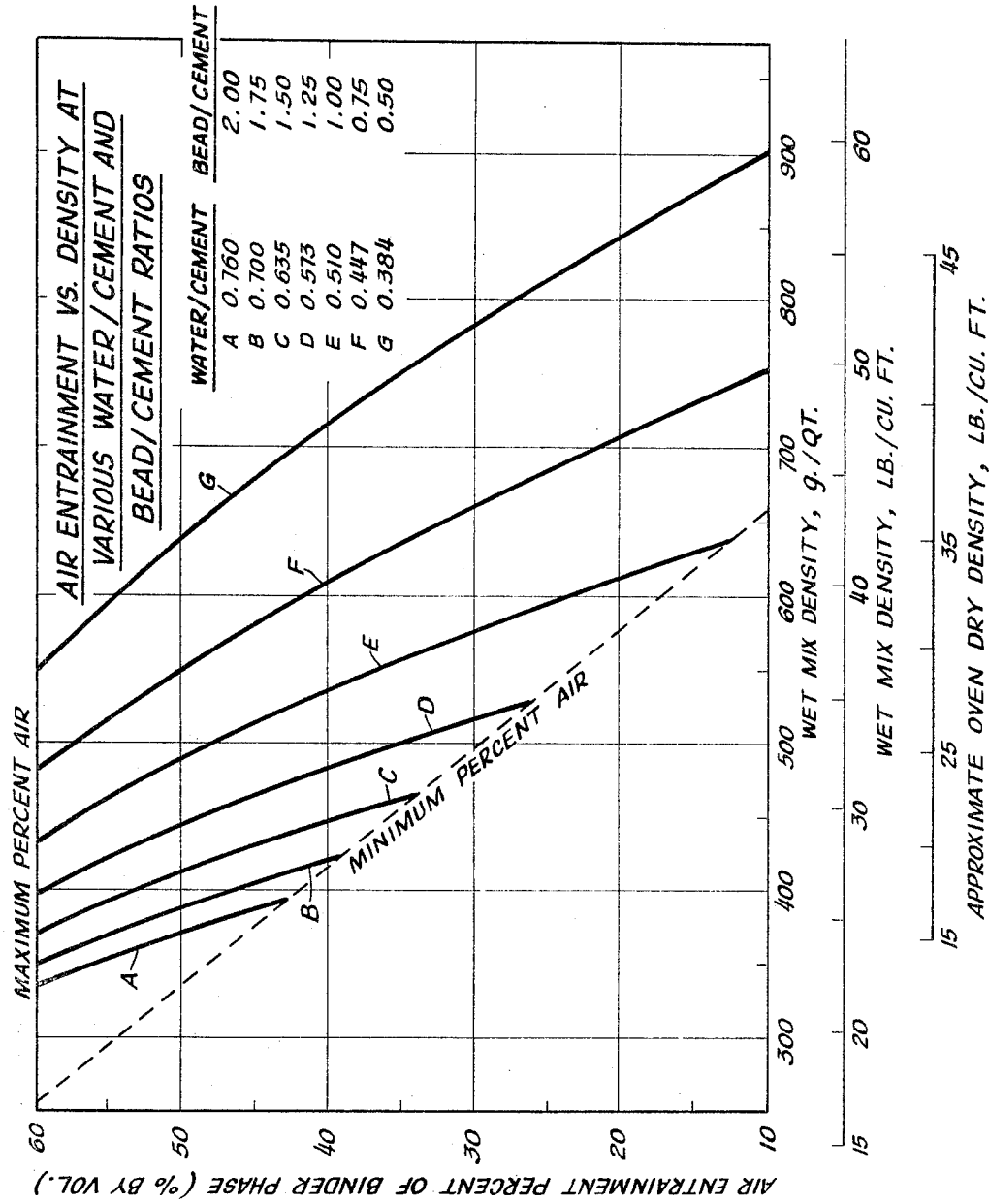

INVENTOR.
ROBERT C. SEFTON
BY Gerhard K. Adam
his Attorney

United States Patent Office 3,272,765
Patented Sept. 13, 1966

3,272,765
LIGHTWEIGHT CONCRETE
Robert C. Sefton, Bridgeville, Pa., assignor to Koppers Company, Inc., a corporation of Delaware
Filed May 18, 1964, Ser. No. 367,932
8 Claims. (Cl. 260—2.5)

This invention relates generally to lightweight construction material and more particularly to low density concrete.

In recent years, greater interest has been focused on the production of lightweight construction materials as a replacement for ordinary concrete. Ordinary structural concrete weighs about 150 pounds per cubic foot. It has been found that the weight of the concrete can be considerably reduced by substitution of lightweight aggregates or by aeration of the concrete. Nominal reductions in the dead weight of concrete have been brought about through the use of manufactured lightweight structural aggregates such as expanded shale or blast furnace slag. Concretes produced with such materials are broadly classified as structural lightweight concretes and they usually fall in the range of 90–120 pounds per cubic foot. When greater weight reductions are desired, such as for floor and roof insulating fills, the formulation may contain special aggregrates such as perlite or vermiculite. The product resulting from the use of perlite or vermiculite is of relatively poor strength at low densities. As an alternative, the aggregates may be eliminated together, and air or gas in the form of tiny bubbles used to increase the bulk of the concrete.

Quite surprisingly, I have discovered a low density concrete can be prepared by providing an aggregate of discrete closed celled expanded polymeric particles homogeneously distributed in a cement binder having entrained therein at least 13.5 percent by volume of air. My novel low density concrete generally has an oven dry weight of about 15–35 pounds per cubic foot. It is a thermal insulating material, substantially fire resistant, and capable of supporting light loads.

The novel product of the invention can be used to make roof deck and wall partitions, and as a core material for laminates. The product can be nailed, sawed, or drilled with ordinary carpenter's tools. In addition to the fact that the material is extremely light in weight, it also has a very high strength relative to its density.

In accordance with the invention, I have discovered a low density concrete composition comprising a lightweight aggregate phase of discrete, closed celled, expanded polymeric particles and a binder phase comprised of hydraulic cement and a surface-active additive, the binder phase containing entrained air in an amount of 13.5–60 percent by volume. The novel low density concrete composition is prepared by mixing under air entraining conditions a lightweight aggregate phase of polymeric particles having a bulk density of about 1–10 pounds per cubic foot and a binder phase of hydraulic cement, water, and a surface-active additive to form a uniform suspension, pouring the mixture into a mold and then curing the concrete mixture.

The aggregate useful for the purposes of this invention is discrete expanded polymeric particles, in particular preexpanded or "prepuff" expandable polystyrene. Such particles have been expanded so that the final density thereof is from about 1–10 pounds per cubic foot, preferably in the range of 1–3 pounds per cubic foot. Structurally, the particles have discrete closed cells which make them substantially water impermeable and thus obviating an increase in the water requirements of the wet cement mix. In addition to polystyrene, the beads may be formed from other synthetic resins such as polyethylene, phenol-formaldehyde condensation products, polyvinyl chloride, polyacrylonitrile, polyacrylic esters, polymethacrylic esters, and copolymers of styrene and comonomers such as butadiene or acrylonitrile.

The expanded polystyrene beads are commercially available from several manufacturers, for example, expandable polystyrene is sold under the trademark, Dylite conventionally. The unexpanded polystyrene particles have incorporated therein from 3–15 percent by weight of a volatile hydrocarbon blowing agent, such as pentane or petroleum ether, which is readily volatilized at elevated temperatures. Heating these particles in an unconfined state expands the polystyrene beads from 10 to 60 times their original size. Conventionally, the heat may be provided by hot air, steam, hot water, infrared radiation, and the like. A well-known method for expanding the beads in a steam preexpander is described in the patent to Hugh Rodman, Jr., U.S. 3,023,175. The use of the Rodman preexpanded has special merit, as it enables the bulk density of the expanded particles to be easily controlled.

The unexpanded particles of polystyrene have about the same density as that of water. For example, expandable polystyrene sold under the trademark Dylite has an actual density of about 65 pounds per cubic foot and a bulky density of about 38 pounds per cubic foot. However, after preexpansion, the expanded polystyrene particles have a bulk density as low as about one pound per cubic foot. These expanded particles are free flowing, and have a satiny white appearance and a continuous outer surface. A cross-section of the expanded polystyrene beads indicates that they are made up of a multiture of extremely fine discrete closed cells.

Small particles of the expanded polymer seem to yield a concrete having the greatest strength. Preferably, the expanded polymeric particles, e.g., polystyrene beads, do not vary greatly in size, such that over 90 percent of the particles pass through a 10 mesh and remain on a 60 mesh screen (U.S. standard), that is, the particles have a diameter of 0.0787–0.0232 inch. This range however is not critical and particles having a diameter of up to 1/4 inch may be used.

The binder phase of the composition of the invention is that portion of the concrete composition which supports the aggregate phase. The binder phase initially includes hydraulic cement, water, and a surface-active additive which functions to homogeneously distribute the aggregate phase and which may, in addition, function as an air entraining agent to provide some or all of the required minimum of 13.5 percent by volume of entrained air. Supplemental air entrainment agents or synergists are used, if required, to augment the air-entraining effect of the surface-active additive.

The cement may be any of the common inorganic hydraulic cements. Thus, in accordance with the invention, one may use conventional Portland cements, gypsum products, high alumina cement, and magnesia cement. These cements are readily available from numerous commercial sources. The choice of type of cement is ordinarily governed by the purpose for which it is to be used. For ordinary structural use, conventional Portland cements should be selected, preferably type I (general purpose) or type III (high early strength) Portland cement.

Water is essential in the chemistry of cement to satisfy the requirements of cement hydration. In addition, water imparts to the concrete mix a workability or flowability characteristic. For most purposes, ordinary tap water is satisfactory.

The surface-active additive is an essential component for making the product of the present invention. The surface-active additive imparts to the concrete mix a pourable characteristic by homogeneously distributing the aggregate phase through the binder phase and at the same time is reduces the water requirements of the mixture. When the additive is present, the aggregate phase, i.e., the beads, tend to remain homogeneously dispersed. In the absence of the additive, the water requirements for the mixture become so high that the relative mobility of the beads in the binder phase increases and, consequently, the difference in density of the beads and the cement causes the beads to segregate and float to the surface of the mixture. The additive, either alone or in combination with a supplemental air-entraining agent, also functions to reduce the density of the novel concrete mix by entrainment of air in an amount of at least 13.5 percent by volume of the binder phase. The vital entrainment of a minimum volume of air, to a large extent, is responsible for the novel properties of the product.

There is a wide choice of surface-active additives useful in the practice of my invention. Useful additives include all known types of anionic, cationic and nonionic surface-active agents. As a practical matter it is best to choose those that provide the required amount of air entrainment or which require the use of only a minimum amount of air entraining synergist in combination therewith. Particularly useful additives can be classified according to their chemical structure as follows:

(1) Anionic agents, which include alkyl aryl sulfonates, such as alkyl naphthalene sulfonates commercially available under the trademarks Alkanol B, Alkanol S and Nekal BX–78; sodium salts of formaldehyde condensed naphthalene sulfonic acids commercially available under the trademarks Darvan No. 1, Darvan No. 2, and Tamol SN; alkyl sulfates, such as lauryl sulfate commercially available under the trademark Duponol WA; lignosulfonates prepared by the sulfonation of lignin, such as calcium lignosulfonate commercially available under the trademark Marasperse C and sodium lignosulfonate commercially available under the trademark Polyfon F; and saponified resins such as the saponified resin extract from southern pinewood commercially available under the trademark Vinsol NVX.

(2) Cationic agents, which include quaternary ammonium salts, such as lauryl pyridinium chloride and trimethyl octadecyl ammonium bromide; and secondary amines, such as N-(1-methylheptyl)ethanolamine and N, N' - bis(1-methylheptyl)ethylenediamine, commercially available under the trademark Alkams.

(3) Non-ionic agents, which include products of ethylene oxide condensed with fatty acids, alcohols or phenols, such as alkylated aryl polyether alcohols commercially available under the trademarks Triton X45, Triton X100 and DMS. Particularly good non-ionic agents, which preferably are used in mixtures, are Tween-80, which is a polyoxyethylene sorbitan monooleate, and Span-80, which is a sorbitan monooleate.

Although most surface-active additives meet the requirement of making the concrete mixture pourable by the homogeneous suspension of the aggregate phase, some, as I have noted, do not cause sufficient air to be entrained to meet the minimum requirements of the product of the invention. As a solution to this problem, I have found that the addition of a small amount of an air entraining synergist will augment the air entraining action of the surface-active additive, and at the same time satisfy the requirements of minimum air entrainment thus broadening the choice of surface-active agent.

The air entraining synergist must meet the following requirements: it should be substantially a liquid aliphatic, naphthenic and/or aromatic hydrocarbon; it should be substantially insoluble in the water; it should be relatively non-volatile so as to stay in the concrete during initial set of the concrete; it should be sufficiently slow in attacking the surface of the beads so as not to cause agglomeration of the beads in the mixer, collapse of the beads, or solution of the beads prior to initial set of the concrete; and it should be low enough in viscosity at mixing temperatures so as to be readily distributed over the surface of the beads in the mixer.

A particularly useful air entraining synergist is commercially available under the trademark Transphalt L–3, which is a dark thermoplastic resin of polymeric polynuclear hydrocarbons made by cracking petroleum under controlled conditions to yield unsaturated aromatics and then polymerizing these aromatics to a product having a melting point of about 3° C. It has a relatively low molecular weight and a high carbon to hydrogen ratio. It contains less than two percent free carbon, and substantial amounts of polymerized unsaturants similar to those found in coal tar fractions boiling between 150–300° C. Transphalt L–3 is soluble in aromatic, chlorinated, and terpene solvents, but only partially soluble in aliphatic hydrocarbons. It is a liquid at room temperature and has a Saybolt viscosity at 210° F. of about 45–55 Saybolt standard units. It dissolves a polystyrene bead in 25–30 minutes.

In addition to Transphalt L–3 a wide variety of hydrocarbons promote the air entraining action of typical surface-active additives, such as Tamol SN. These various hydrocarbons range from ink oil and a mixture of 1:1 asphalt/ink oil, which are mixed aliphatic-naphthenic types, to tar/creosote mixtures which are highly aromatic. On the other hand tricresyl phosphate and dibutyl phthalate, which do not fall into these hydrocarbon classes, were found to be ineffective in promoting air entrainment.

Relative nonvolatility is necessary to hold the hydrocarbon air entraining synergist in the wet mix during mixing and up to initial set in order to obtain uniform and stable air entrainment. It is also desirable, from a practical standpoint, to avoid the explosive hazards resulting from more volatile hydrocarbons. Thus, generally the boiling point of the hydrocarbon should be above 175° C. (760 mm.) to meet these requirements.

The rate at which the hydrocarbon synergist attacks polystyrene beads is dependent upon the viscosity, the molecular weight and the type of hydrocarbon. Aliphatic hydrocarbons are slowest to attack polystyrene beads, naphthenic hydrocarbons moderately attack the beads, and aromatic hydrocarbons are fastest to attack the beads. As the viscosity and molecular weight of each of the hydrocarbon types increase, the rate of attack on the polystyrene beads correspondingly decreases. Among common aromatic hydrocarbons which attack polystyrene beads too rapidly for practical mixing are xylene and tetralin, e.g., a bead placed in an excess of xylene or tetralin dissolves in about 15 seconds. Octahydrophenanthrene and Kolineum (a trademark for a purified creosote fraction) are borderline in being slow enough in attacking polystyrene beads to be used in a practical mix. A bead placed in an excess of the latter hydrocarbons dissolves in about 5–6 minutes.

The slower action of naphthenic hydrocarbons on polystyrene beads is illustrated by cyclohexane, which dissolved a bead in one or two minutes and perhydrophenanthrene which fails to dissolve a bead in two days. The very slow action of aliphatic hydrocarbons on polystyrene beads is illustrated by n-heptane and ink oil which fail to dissolve a bead in several days.

Air entrainment, as used herein, means a stable dispersion of fine bubbles of air having a diameter of about 0.05 mm. in a mixture of cement, water and aggregate. This dispersion is stabilized by the surface-active additive, and the amount of entrained air is dependent upon the surface-active additive added and the air entraining synergist, if one is used. The maximum amount of air entrainment that a concrete can contain is about 60 percent of the total volume of the binder phase including the entrained air.

Foaming is the condition that occurs when the volume of the entrained air exceeds the approximate 60 percent limit. Under foaming conditions, there is no longer enough binder phase to enclose the air in the form of small spherical bubbles. At this point the air forms large irregular cells or foam and as a result the concrete structure becomes irregular and weakened.

The strength of my novel low density concrete is primarily a function of density and is measured after curing for initial period of seven days and finally at 28 days. In considering the compressive strength, one must of necessity consider the factors which influence the density. The density of the concrete is a function of: the water/cement ratio; the bead/cement ratio; the bead size and density; the type and concentration of surface-active additive; and the percent of air entrainment. These factors are interrelated and cannot be considered as independent variables. For this reason, the independent effect of each factor must be considered relative to the other factors.

The water to cement ratio tends to a large extent on the workability or pourability of the wet concrete mix. This is a practical matter and readily determined by one working in the art. Scientifically, the pourability is determined by flow measurements in accordance with ASTM method C–230. In this method the wet concrete is molded at the center of the flow table into the shape of a frustrum of a cone. The table is then dropped abruptly 25 times in 15 seconds through a freefall of ¾ inch. The wet cement specimen flattens out in proportion to its pourability, and flow is recorded as the percent increase in the diameter of the specimen beyond the initial diameter of 4 inches. The novel low density concrete should have a flow of 45–75 percent, preferably in the range of 60–65 percent, which is considered as the standard flow.

Various factors affect the water/cement ratio required for standard flow. Thus, the water/cement ratio must be increased with an increasing bead/cement ratio. The water/cement ratio required for the standard flow is also dependent upon the bead size. For the same standard flow, larger beads require less water or correspondingly a lower water/cement ratio. Usually, within the range of bead sizes set forth above, the effect of bead size is small.

The type and amount of surface-active additive influences the water/cement ratio required for standard flow. When the additive is omitted entirely, a considerably greater amount of water is required for a standard flow than is necessary when the surface-active additive is present. Air entrainment influences the required water/cement ration only to a secondary extent when an effective surface-active additive is present.

The density of the product is primarily dependent upon the bead to cement ratio. In determining the density of the concrete, oven dry densities are preferred, since this eliminates inaccuracies introduced by variations in the water content of the concrete. The oven dry density is obtained by heating concrete to a temperature of about 110–115° C. until a constant weight is obtained. Oven dry densities ranging from 15–35 pounds per cubic foot are readily obtained by varying the bead/cement ratio from about one-half to two times the preferred standard ratio of 7.8 parts by weight of beads (having a density of about 1.9 pounds per cubic foot) to 100 parts by weight of cement, which is equivalent to about four quarts of beads to 1585 grams of cement. These figures may be readily converted to those commonly used in the field which is in terms of bags of cement to cubic feet of aggregate. A bag of cement customarily contains 94 pounds of cement. The ratio of cubic feet of beads to bags of cement varies in accordance with this invention from 2:1 to about 8:1.

The bead-cement ratio affects the water to cement ratio that is required to obtain a standard flow of the wet mix. The bead/cement ratio also influences the amount of air entrainment that a given surfactant system will produce. Air entrainment appears to be dependent upon the area of solid surface presented by the aggregate or bead phase. The smaller beads produce more air entrainment than do larger beads.

A typical low density concrete prepared according to the present invention contains the following ingredients which for the purposes of further discussion is designated the standard mixture.

*Standard mixture*

| Ingredient | Parts by weight |
| --- | --- |
| Polystyrene beads (1.9 lb./cu. ft. density) | 7.8 |
| Portland cement | 100 |
| Water | 51 |
| Surface-active additive | 0.36 |
| Air entraining synergist | 0.56 |

The type and amount of surface-active additive used for making the novel low density concrete should be such that the additive provides a wetting and dispersing action and, either alone or in combination with an air-entraining synergist, a controlled level of air entrainment. It has been found that low densities in the range of 15–35 pounds per cubic foot (oven dry density) coupled with acceptable strength values cannot be obtained either with beads or air alone, but only this particular combination will provide the desired product.

Some surface-active additives, when used alone are weak air entraining agents, yet are capable of maintaining a good distribution of binder phase around the polymeric beads and therefore, also good strength values at densities greater than 35 pounds per cubic foot. A nonionic surface-active agent sold under the trademark Tween-Span (a mixture of 75 parts Tween 80 and 25 parts Span 80) is representative of such compounds. This additive is effective in giving a 50 percent flow (ASTM C–230) at an 0.446 water/cement ratio compared to a water/cement ratio of 0.510 for the standard mix for the same flow. The combination of Tween and Span gives compressive strength value at least as great as those of the standard mix. However, at equal bead to cement ratios, the Tween and Span compositions are 20–30 percent higher in density than the standard mixes. This difference can be explained by higher level of air entrainment in the standard mixes than in the Tween and Span mixes. To improve the density of this product a suitable air entraining synergist must be added.

The ability of a surface-active additive at a fixed concentration to entrain air in a concrete depends to a large extent upon the surface area of the aggregate phase. Thus, when no beads are present, the mixture of Tamol SN and Transphalt L–3 exhibits very little air entraining activity. In the presence of beads, the air entraining action increases as the ratio of beads to binder phase increases. On the other hand, in the case of Vinsol NVX, this relationship is less pronounced.

The working limits for the amount of surface-active additive fall within the range of adequate wetting and dispersing action on the one hand and excessive foaming action on the other hand. This varies considerably from one surface-active additive to another. For example, the Tamol SN-Transphalt L–3 system, Tween-Span, and Vinsol NVX have a wide spread between the working limits. On the other hand, Triton X100 and lauryl pyridinium chloride have a very narrow spread between the same working limits. In general, the amount of surface-active additive required to produce the novel concrete is from 0.01–1.0 percent by weight of the cement.

A comparison of the various surfactants which had adequate wetting and dispersing action is shown in the table below. Those surfactants permitting the formulation of concrete having wet densities of less than 37 pounds per cubic foot on a wet basis, or less than 30 pounds per cubic foot on an oven dried basis, that is, in which the air entrainment value is greater than 35 percent of the binder phase, are classified as good to excellent air entraining agents. Air entraining agents producing low density concrete having an air entrainment of 20–35 percent of the binder phase are classified as average air entraining agents; those in which less than 20 percent of the binder phase is entrained air designated as weak air entraining agents. These classifications are not absolute and are given for comparison purposes only.

| Excellent | Average | Weak |
|---|---|---|
| Vinsol NVX | Alkanol S | Trimethyl Octadecyl Ammonium Bromide. |
| Tamol SN | Polyfon F, H | Lauryl Pyridinium Chloride. |
| Darvan No. 1 | DMS | Tween 80 and Span 80. |
| Darvan No. 2 | Deriphat 151 | Nekal BX-78. |

The presence of an air entraining synergist such as Transphalt L-3 is essential to the air entraining action of some of the surface-active additives, such as Tamol SN, but is not required by others, such as Vinsol NVX. Tar/Kolineum mixtures of suitable fluid viscosity can replace L-3 with similar results. Usually the amount of air entraining synergist added is in the range of from 0 to 2.0 percent by weight of the cement. For those surface-active additives which when used alone fail to meet the air entraining requirements, a minimum amount of air entraining synergist of 0.1 percent by weight of cement is generally used. If more than the maximum amount is used, foaming occurs and the solvent action of the synergist on the beads becomes more pronounced.

For the concrete to have an oven dry density within the range of 15–35 pounds per cubic foot, the concrete must contain both polymeric beads and entrained air. FIGURE 1 shows the percent air entrainment compared to the density at various water/cement and bead/cement ratios. The maximum percent of air of the binder phase is 60 percent by volume. FIGURE 1 shows that as the quantity of cement is kept constant and the quantity of beads increases, that is, while the ratio of beads to cement goes from the standard mixture to 2.0 times the standard mixture, the minimum percent of air required also increases. As the number of beads relative to the amount of cement increases, the void spaces between the beads also increases; thus to fill the increased void spaces the binder phase must be extended which, in this case, is done by the addition of air to the binder phase. The minimum amount of air required in the binder phase within the density ranges of the concrete set forth above is 13.5 percent by volume which is the minimum amount of air required in the standard mixture. When the amount of entrained air falls below the minimum, the binder phase is not sufficient to fill the void spaces between the beads, the beads are not sufficiently enveloped in the cement mixture, and the result is a non-homogeneous weak product.

Figure 2:
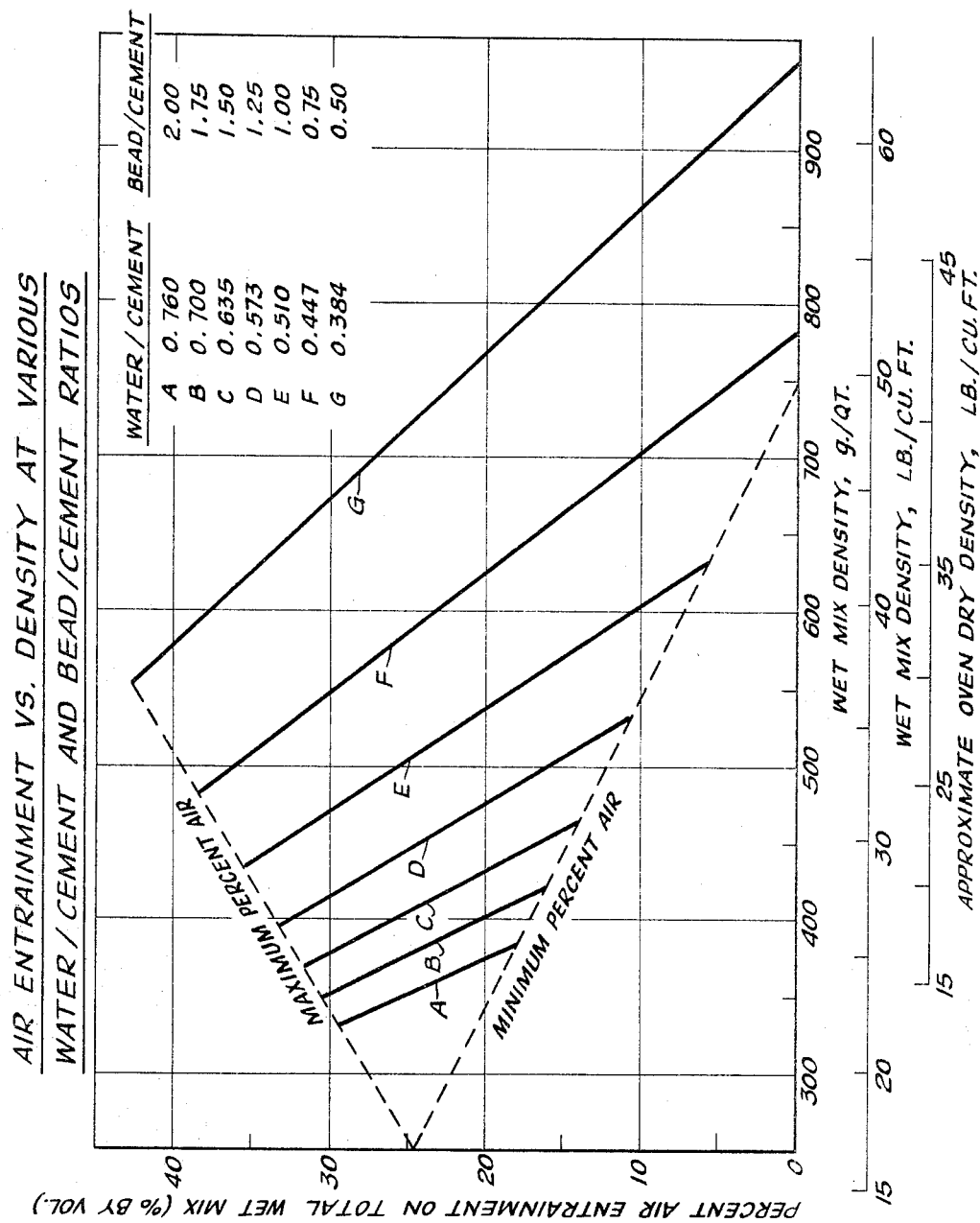

In FIGURE 2 the amount of air entrained is considered relative to the total concrete mixture. The maximum percent air contained in the total mixture is directly proportional to the amount of binder phase actually present. Since the amount of air present cannot exceed a maximum of 60 percent by volume of the binder phase, the maximum air contained in total mixture is 60 percent by volume of the binder phase actually present in the total mixture. The minimum percent air is also determined as the amount of air required to extend the binder phase to the point where it covers or fills the void spaces between the beads.

FIGURE 2 is helpful in estimating the ratio of beads to cement and the amount of air entrainment required to produce a product of a particular density. The densities as given were determined on the wet mixture and have been plotted on the wet mix density scale. The oven dry densities are generally approximations of the oven dry density as extrapolated from the wet mix.

As an illustration in designing a concrete mix having a particular density, assume that a low density concrete having a density of about 25 pounds per cubic foot oven dry is desired. The approximately 25 pounds per cubic foot line intersects lines D, E, and F representing various bead/cement ratios. Thus, it is theoretically possible to design a mixture having from 0.75 to 1.25 times the standard bead to cement ratio. The amount of air required to obtain the particular desired density would be about 23 percent, 27 percent, and 37 percent air of the total wet mix respectively. In practice, since the amount of air required in line F approaches the theoretical maximum and the representation is subject to variances in reproducibility, the skilled operator would probably design a mixture based on the ratio represented by lines D or E.

Figure 3:
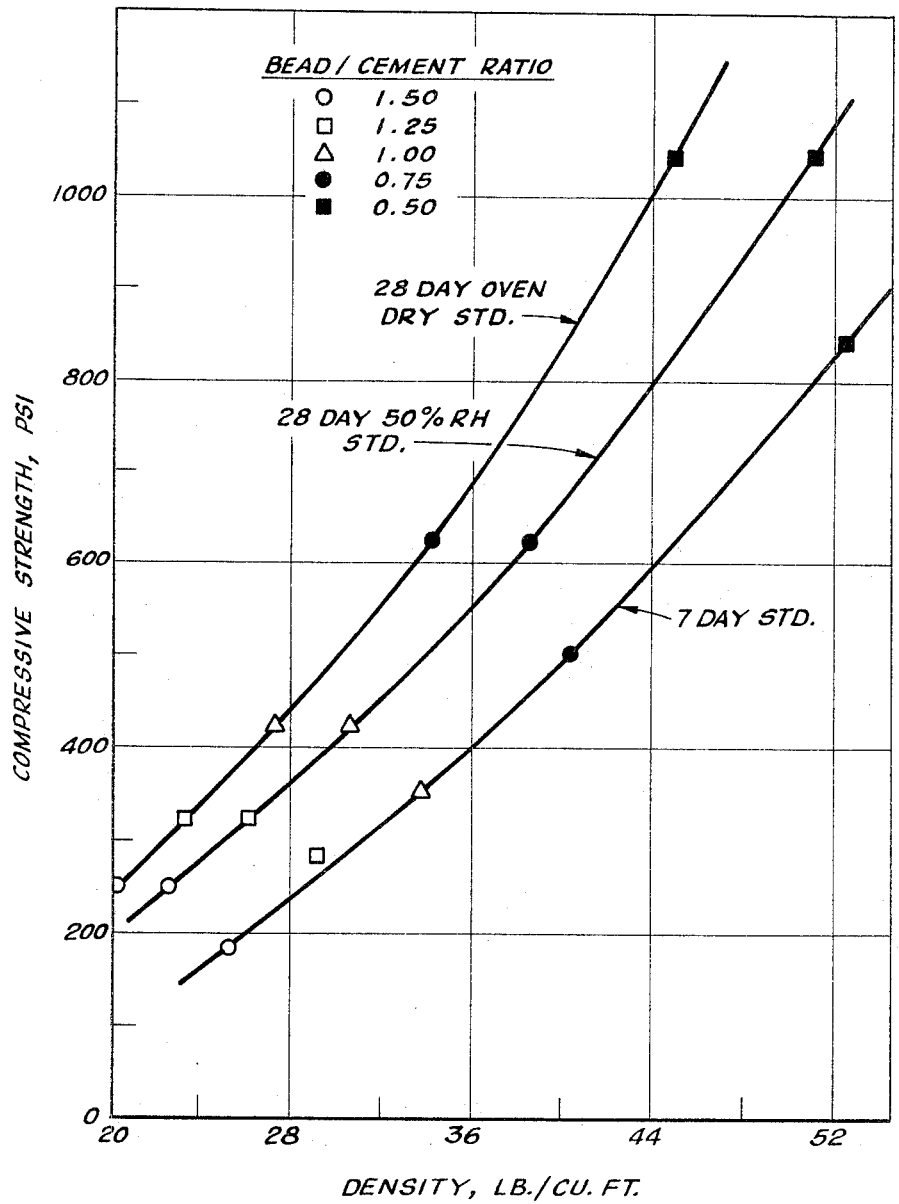

FIGURE 3 represents the relationship between the density and compressive strength of the low density concrete, prepared according to the present invention. FIGURE 3 shows the compressive strength to be approximately proportional to the density. This is explained by the fact that the compressive strength increases as the amount of cement present in the concrete mix is increased. In contrast to ordinary concrete in which the gravel aggregate has a strength considerably in excess of the binder, in low density concrete the water/cement paste primarily contributes the strength properties while the polymeric beads and air spaces contribute very little to the strength of the final product. The bottom curve represents the strength of the standard mixture after a curing period of seven days under wet conditions. After 28 days curing the strength is considerably increased as shown in the upper curves in which the values are given both in terms of 50 percent relative humidity, and after drying in an oven to constant weight. At an oven dry density of about 34 pounds per cubic foot, compressive strengths in excess of 600 pounds per square inch can be obtained in accordance with the invention.

Figure 4:
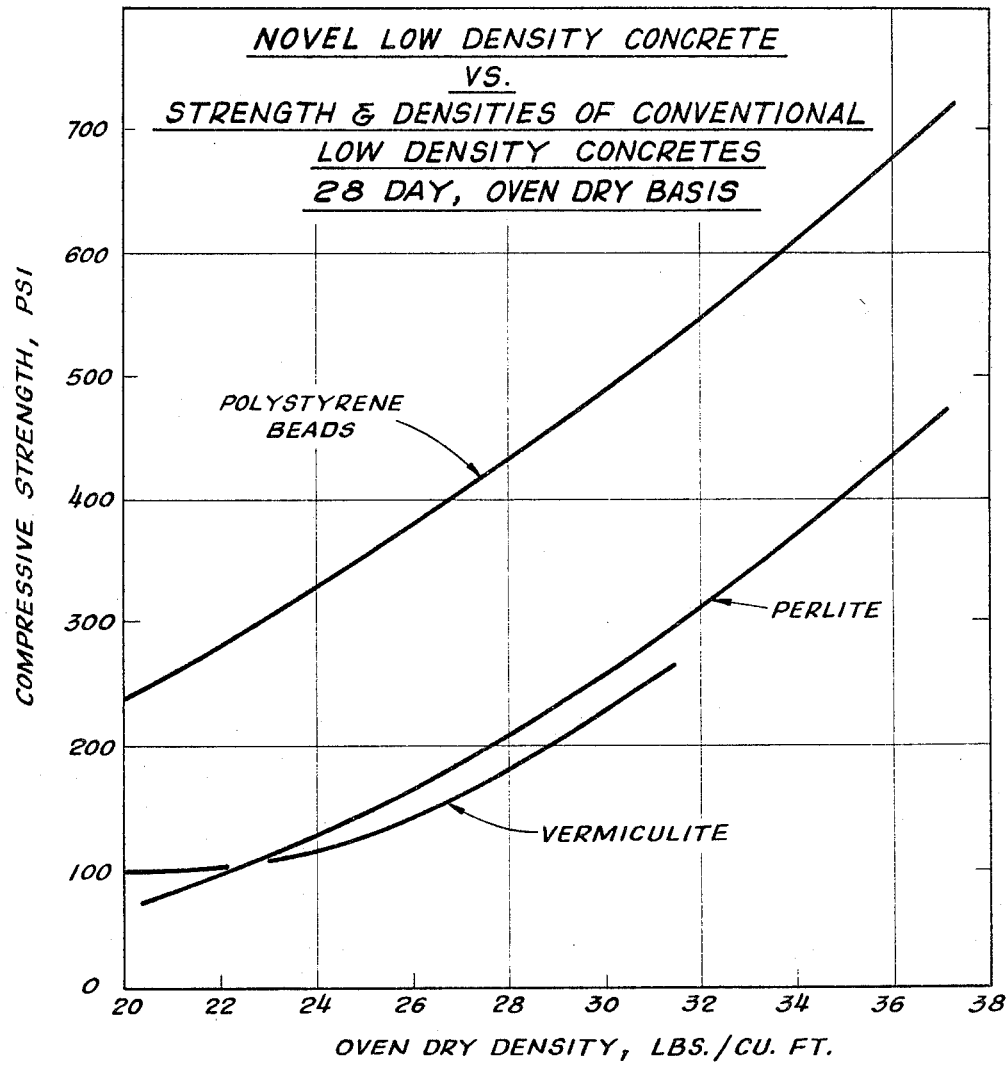

The unusual nature of the novel low density concrete of this invention is illustrated in FIGURE 4 as compared with commercially available concretes purchased on the open market. The concretes indicated as perlite and vermiculite are conventional low density concrete mixes. Perlite is a volcanic glass rock containing trapped water. When the rock is heated to about 1500° F. the crude perlite particles expand and turn white, much like popcorn, as the trapped water vaporizes to form microscopic cells or voids in the softened glass. Similarly vermiculite is a mica-like material which when heated to a temperature of 1000–1500° F. exfoliates, giving a product with a loose weight of about 4–15 pounds per cubic foot. The foam polystyrene beads on the other hand are small cellular particles having a bulk density of 1–10 pounds per cubic foot. The polystyrene beads though are structurally closure celled whereas expanded perlite and expanded vermiculite both have open cells. These open cells one would think would give a greater adherence of the concrete to the vermiculite and perlite particles thereby giving a greater strength. It is surprising nevertheless to find that the novel low density concrete, made in accordance with this invention, has a strength of about twice as great as that of the conventional vermiculite or perlite concretes at the same density levels. This is illustrated by FIGURE 4 which shows the compressive strength of conventional vermiculite and perlite concretes and the novel concrete of the present invention at the same density levels. This compressive strength of course is extremely important when the low density concrete is to be used for precast roof deck slabs. The increased compressive strength of the novel concrete means that whereas perlite and vermiculite concretes generally require a reinforcing bar, the novel concrete can be produced such that it does not require a reinforcing bar, as for example to handle snow loads on the roof.

My invention is further illustrated by the following examples.

*Example I*

Into a mixer (12 cu. ft. Essick plaster and mortar mixer), was added 125 pounds water, 1 pound of Tamol SN to form a solution. Then 10 cubic feet of polystyrene beads having a bulk density of 1.9 pounds per cubic foot (90 percent passed through a 10 mesh and remain on a 60 mesh screen U.S. standard) were added. The mixing (at a speed of 34 r.p.m.) for about 1 minute was continued. Then 1.5 pounds of Transphalt L-3 was added to the mixer and the mixing continued for a period of about one minute. At the end of this period 280 pounds of Portland cement, type III, were added to the mixture and the mixing resumed for a period of about 6 minutes.

The concrete mixture was poured, with agitation, into a mold and cured under standard conditions as specified in ASTM method C-332 for lightweight structural concrete (a cure for 7 days under moist conditions, followed by a cure for 21 days at 50 percent relative humidity both curing time being carried out at a temperature of 73.4° F.). It had wet density of about 35 pounds per cubic foot.

The resulting concrete cast from the composition is homogeneous in appearance, is light gray and tends to be flexible. It has a density of 27 pounds per cubic foot, oven dry, and a compressive strength of 478 pounds per square inch. The product could be sawed, drilled, and nailed with ordinary carpenter's tools.

*Example II*

Using the mixer and procedure of Example I, 112.5 pounds of water, one pound of Tamol SN, 9 cubic feet polystyrene beads (expanded to a bulk density of 1.9 pounds per cubic foot) and 1.4 pounds of Transphalt L-3 were placed in the cement mixer and agitated until the beads were uniformly coated with the aqueous mixture. Then 253 pounds of Portland cement (type III) were added and the mixing continued for about 6 minutes. Then an additional 25 pounds of water was added and the mixing continued for about four minutes.

The wet cement mix was poured from the mixer into a molding billet without vibration and cured according to standard conditions and procedures for a period of 28 days.

The resulting product had a density and compressive strength similar to the product in Example I. A comparison between the two products shows that the composition of Example II had a higher flowability, had a more uniform distribution of small air cells and required no vibration inside or outside the mold.

*Example III*

Into a 10 quart Hobart mixer, with a wire whip type agitator operated at 258 r.p.m., was added 608 cc. of water and 5.7 grams of Tamol SN with mixing until the surface-active agent had dissolved. The mixer was stopped and four quarts of polystyrene beads were added. Thereafter, the mixing was continued until the beads were thoroughly wetted (approximately 2 minutes), and then Transphalt L-3, 8.8 grams, was slowly added over a period of 10-15 seconds and mixed for about 30 seconds additional time. The cement, 1585 grams, was rapidly added to the mixture and the mixing continued for 5 minutes. The mixer was stopped, and the wet mix was allowed to set for five minutes. Mixing was then resumed and 200 c. of the water was added to give the desired flow of about 5.5-6.5 inches as measured on a slump table (25 strokes in 15 seconds). After the final addition, mixing was continued for an additional minute.

The wet concrete mix was then poured into one quart cartons during which a vibrator rod was inserted within each carton and the cartons placed on an external vibrating table. This settled the concrete and helped to eliminate large void spaces in the samples. After a carton was filled, the inner vibrator rod was removed, the carton allowed to vibrate for an additional minute. About 4–5 quarts of wet concrete mix were obtained. The samples in cartons were then cured according to the standard procedure outlined in Example I above.

The procedure described above was repeated to make six samples and the average wet weight of the quart cartons was found to be 550 grams per carton.

*Example IV*

To determine the effect of the presence of the surface-active additive in the formulation without the air entraining synergists, the following mixes were prepared using the formulation and procedure of Example III with the exception that Transphalt L-3 was omitted in all mixes and five quarts of beads were used in mix C. These were compared with the standard mix which contains Transphalt L-3. These results are given in the table below.

TABLE I

| Mix No. | Beads (qts.) | 7 Day Properties | | | Binder Phase, percent |
|---|---|---|---|---|---|
| | | Density, lbs./cu. ft. | Compressive Strength (p.s.i.) | Percent of Standard | |
| A | 4 | 38.8 | 465 | 99 | 22 |
| B | 4 | 39.7 | 438 | 89 | 18 |
| C | 5 | 35.7 | 301 | 77 | <10 |
| Std | 4 | 33.7 | 353 | 100 | 37 |

The experiment indicates that in the absence of air entraining synergist the amount of entrained air is considerably reduced and correspondingly the density of the concrete is increased.

*Example V*

To determine the effect of the air entraining synergist in the absence of the surface-active agent the following mixes were prepared according to the formulation and procedure of Example III with the exception that Tamol SN was omitted. Results are shown in the table below. The standard mix was used as a basis for comparison.

TABLE II

| Mix No. | Beads (qts.) | 7 Day Properties | | | Binder Phase, percent |
|---|---|---|---|---|---|
| | | Density, lbs./cu. ft. | Compressive Strength (p.s.i.) | Percent of Standard | |
| D | 4 | 41.7 | 406 | 75 | 10 |
| E | 4 | 44.9 | 435 | 69 | <10 |
| F | 5 | 41.0 | 321 | 62 | <10 |
| Std | 4 | 33.7 | 353 | 100 | 37 |

The foregoing indicates that the air entraining synergist imparts no improvement of properties in the absence of the surface-active additive.

*Example VI*

To determine whether the surface-active additive and the air entraining synergist are essential to the formulation, the following mixes were prepared according to the procedure of Example III with the exception that both the additive and the synergist were omitted entirely.

Results are shown in the table below:

TABLE III

| Mix No. | Water Content, g. | Bead Content, qts. | 7 Day Properties | | | Flow of Wet Mix, Percent |
| --- | --- | --- | --- | --- | --- | --- |
| | | | Density, lbs./cu. ft. | Compressive Strength, p.s.i. | Strength Rating, Percent of Std. | |
| G | 808 | 4 | 43.4 | 493 | 84 | <10 |
| | | | 43.8 | 523 | 87 | |
| H | 908 | 5 | 40.2 | 377 | 75 | 10 |
| | | | 40.5 | 397 | 78 | |
| I | 958 | 6 | 33.5 | 235 | 67 | <10 |

In the absence of both the additive and the synergist, the flow characteristics were so low that the wet mix had to be tamped into the cartons. Thus the densities of the products was considerably increased and the strength ratings were decreased in comparison to the standard. Mixes G and H were reasonably well filled and contained no unusually large holes or air bubbles, but in Mix I the beads were starved for cement and there was insufficient binder phase to coat the beads.

*Example VII*

To determine the effect of an increase or decrease in the concentration of the surface-active additive on the concrete product, various mixes were prepared according to the formulation and procedure of Example III with the exception that the Tamol SN concentration was varied from 0 to twice the standard amount of 5.7 grams of Tamol SN to 1585 grams of cement as used in the standard mix. The results are given in the table below:

*Example VIII*

To determine the effect of an increase or decrease in the concentration of an air entraining synergist on the characteristics of the product obtained, various mixes were prepared according to the formulation and procedure of Example III with the exception that the concentration of Transphalt L-3 was varied from 0 to 4 times the standard amount of 8.8 grams Transphalt L-3 to 1585 grams of cement or used in the standard mix. Results are shown in the table below:

TABLE V

| Mix No. | Transphalt Conc. (Std.=1) | Water Content, cc. | Flow, Percent | Air Entrainment Percent of Binder Phase | 28-Day Compressive Strength, p.s.i. | Oven Dry Density, lbs./cu. ft. | Strength, Percent of Std. Mix |
| --- | --- | --- | --- | --- | --- | --- | --- |
| P | 0 | 908 | 50 | 22 | 580 | 31.2 | 111 |
| Q | ½ | 808 | 52 | 35 | 548 | 29.0 | 115 |
| Std | 1 | 808 | 58 | 37 | 422 | 27.2 | 100 |
| R | 2 | 758 | 43 | 35 | 470 | 30.0 | 94 |
| S | 3 | 858 | 60 | 43 | 398 | 26.3 | 102 |
| T | 4 | 808 | 55 | 40 | 423 | 27.3 | 89 |

*Example IX*

Following the formulation and procedure of Example III, the surface-active agent was changed to Vinsol NVX, the amount of Transphalt L-3 was varied and the water was adjusted to give the flow range required for molding as noted below. The following mixes were prepared and the results are as given in the table below:

TABLE IV

| Mix No. | Tamol Conc. (Std.=1) | Water Content, cc. | Flow, percent | Air Entrainment, percent of Binder Phase | Compressive Strength, p.s.i. | Oven Dry Density, lbs./cu. ft. | Strength, percent of Std. Mix |
| --- | --- | --- | --- | --- | --- | --- | --- |
| J | 0 | 808 | 25 | 10 | 523 | 32.8 | 92 |
| K | ⅛ | 908 | 50 | 12 | 534 | 32.3 | 96 |
| L | ¼ | 808 | 40 | 18 | 591 | 32.3 | 105 |
| M | ½ | 808 | 43 | 29 | 528 | 30.0 | 105 |
| Std | 1 | 808 | 58 | 37 | 422 | 27.2 | 100 |
| N | 1½ | 708 | 50 | 41 | 465 | 28.5 | 102 |
| O | 2 | 808 | 40 | 43 | 402 | 27.2 | 95 |

TABLE VI

| Mix. No. | Vinsol Content, g. | Water Content, cc. | Beads, qt. | Flow, Percent | Air Entrainment Percent Binder Phase | 7 Day Properties | | |
| --- | --- | --- | --- | --- | --- | --- | --- | --- |
| | | | | | | Density, lbs./cu. ft. | Compressive Strength, p.s.i. | Strength, Percent of Std. |
| U [1] | 5.7 | 708 | 4 | 44 | 45 | 31.4 | 307 | 102 |
| V [2] | 5.7 | 758 | 4 | 35 | 51 | 30.3 | 262 | 94 |
| W [3] | 5.7 | 858 | 5 | 31 | 55 | 26.2 | 201 | 106 |

[1] 8.8 g. Transphalt and 1,585 g. cement.
[2] 0 g. Transphalt and 1,585 g. cement.
[3] 11.25 g. Transphalt and 1,585 g. cement.

Example X

To show the wide range of surface-active additives which could be used in accordance with the invention, the following mixes were prepared according to the formulation and procedure of Example III with the exception that the amount and type of surface-active additive as indicated was substituted for the Tamol SN of Example III. The results are given in the table below:

TABLE VII

| Mix No. | Surfactant | Wet Mix Density, lbs./cu. ft. | Air Entrainment, Percent of Binder Phase | Compressive Strength, Percent of Std. (28-Day) |
|---|---|---|---|---|
| 5.7 g. Surfactant:[1] | | | | |
| AA | Vinsol NVX | 34.0 | 45 | 92 |
| AB | Vinsol [2] NVX | 31.9 | 51 | 96 |
| AC | Polyfon-F | 40.0 | 22 | |
| Std | Tamol SN | 34.8 | 42 | 100 |
| AD | Darvan No. 1 | 36.0 | 38 | 104 |
| AE | Alkanol S | 37.9 | 30 | 110 |
| AF | Polyfon-H | 38.4 | 28 | |
| AG | Deriphat 151 | 39.9 | 22 | 99 |
| AH | Nekal BX-78 | 44.0 | Low | 99 |
| 1.14 g. Surfactant:[1] | | | | |
| AI | DMS | 38.9 | 27 | 106 |
| AJ | Vinsol [2] | 33.2 | 48 | 98(?) |
| 0.57 g. Surfactant:[1] | | | | |
| AK | Tween-Span | 42.8 | Low | 107 |
| AL | TOAB | 41.8 | 14 | 95 |
| AM | LPC | 41.5 | 14 | 99 |
| AN | DMS | 40.2 | 22 | 100 |
| AO | Vinsol [2] NVX | 35.4 | 41 | 109 |

[1] Surfactant quantities based on laboratory batches of 1,585 g. cement and 4 quarts of Dylite beads.
[2] No Transphalt present.

Example XI

To determine substitutes for Transphalt L-3, the wide range of air entraining synergists which could be used in accordance with the invention, the following mixes were prepared in accordance with the procedure of Example III with the exception that 8.8 grams compositions listed below are substituted for the Transphalt of Example III. The results are given in the table below:

TABLE VIII

| Mix No. | Composition Variable | Density, lbs./cu. ft. | 28-Days Compressive Strength, p.s.i. | Strength, Percent of Std. | Air Entrainment, Percent of Binder Phase |
|---|---|---|---|---|---|
| BA | Std. Composition, Transphalt and Tamol | 32.5 | 312 | 95 | 45 |
| BB | Ink Oil | 36.5 | 391 | 95 | 32 |
| BC | Perhydrophenanthrene | 38.3 | 450 | 99 | 28 |
| BD | Transphalt Distillate | 37.4 | 427 | 99 | 30 |
| BE | 1/1 Tar/Kolineum | 34.6 | 389 | 104 | 40 |
| BF | 2/1 Tar/Kolineum | 34.6 | 355 | 96 | 40 |
| BG | Tricresyl Phosphate | 40.0 | 460 | 93 | 16 |
| BH | Dibutyl Phthalate | 43.2 | 469 | 81 | 10 |
| BI | 1/1 Asphalt/Kolineum | 36.2 | 378 | 91 | 35 |
| BJ | 1/1 Asphalt/Ink Oil | 36.2 | 380 | 91 | 32 |

Example XII

To illustrate the effect of varying the bead to cement ratio on the density of the concrete product, various mixes were prepared following the procedure of Example III with the exception that the bead to cement concentration was varied from ½ to 1½ times the standard amount of 4 quarts of polystyrene beads (having a density of 1.9 pounds per cubic foot) to 1585 grams of cement. Results are shown in the table below:

TABLE IX

| Mix. No. | Bead[1] Conc. | 7-Day Values | | 28-Day Values | | | Air Entrainment by Volume | |
|---|---|---|---|---|---|---|---|---|
| | | Density, lbs./cu. ft. | Compressive Strength, p.s.i. | Density, lbs./cu. ft. | Compressive Strength, p.s.i. | Oven Dry Density, lbs./cu. ft. | Percent Total | Percent Binder |
| CA | ½ | 55.1 | +1,100 | 52.6 | +1,100 | 47.2 | 8 | 15 |
| CB | ½ | 52.3 | 840 | 50.8 | 1,042 | 44.7 | 14 | 23 |
| CC | ¾ | 43.5 | 576 | 41.1 | 700 | 37.1 | 14 | 22 |
| CD | ¾ | 39.8 | 546 | 37.3 | 637 | 33.5 | 18 | 34 |
| CE | ¾ | 40.2 | 502 | 38.5 | 623 | 34.2 | 18 | 39 |
| CF | 1 | 34.1 | 347 | 31.3 | 416 | 27.8 | 19 | 39 |
| CG | 1¼ | 29.8 | 277 | 27.4 | 356 | 24.4 | 19 | 41 |
| CH | 1¼ | 29.0 | 266 | 26.2 | 322 | 28.3 | 21 | 44 |
| CI | 1½ | 26.9 | 190 | 23.1 | 248 | 20.7 | 19 | 43 |
| CJ | 1½ | 25.4 | 183 | 22.7 | 248 | 20.4 | 21 | 46 |

[1] Mix CF is a "standard" mix using 4 quarts of Dylite beads with 1,585 g. of cement and 808 g. of water. This standard bead/cement ratio is indicated as 1 in this column.

Example XIII

To illustrate the effect of the surface-active additive on the water/cement ratio or the amount of water required to obtain the required flow characteristics the following mixes were prepared using the procedure of Example III but using different surface-active additives. The results are shown in the table below:

TABLE X

| Mix No. | Name | Type | Amt., g. | Water Requirement, g. |
|---|---|---|---|---|
| DA | Vinsol NVX | Anionic | 5.7 | 708 |
| DB | Vinsol [1] NVX | do | 5.7 | 758 |
| DC | Polyfon-F | do | 5.7 | 758 |
| Std | Tamol SN | do | 5.7 | 808 |
| DD | Darvan No. 1 | do | 5.7 | 808 |
| DE | Alkanol S | do | 5.7 | 808 |
| DF | Polyfon H | do | 5.7 | 808 |
| DG | Deriphat 151 | Amphoteric | 5.7 | 808 |
| DH | Nekal BX-78 | Anionic | 5.7 | 850 |
| DI | Darvan No. 2 | do | 5.7 | 908 |
| DJ | Sodium Polyacrylate | do | 5.7 | 908 |
| DK | Triton X45 | Nonionic | 5.7 | 908 |
| DL | Alkam | Cationic | 5.7 | 1,008 |
| DM | Marasperse C | Anionic | 5.7 | 1,058 |
| DN | DMS | Nonionic | 5.7 | Foam |
| DO | Triton X100 | do | 5.7 | Foam |
| DP | Duponol WA | Anionic | 5.7 | Foam |
| DQ | DMS | Nonionic | 1.14 | 758 |
| DR | Vinsol [1] NVX | Anionic | 1.14 | 808 |
| DS | LPC [2] | Cationic | 1.14 | Foam |
| DT | Triton X100 | Nonionic | 1.14 | Foam |
| DU | Tween-Span | do | 0.57 | 708 |
| DV | TOAB [3] | Cationic | 0.57 | 758 |
| DW | LPC [1] | do | 0.57 | 758 |
| DX | DMS | Nonionic | 0.57 | 808 |
| DY | Vinsol [1] NVX | Anionic | 0.57 | 808 |

[1] No Transphalt present.
[2] LPC is lauryl pyridinium chloride.
[3] TOAB is trimethyl octadecyl ammonium bromide.

The foregoing has described a novel concrete which is usable as an insulating fill for panel structures and as an insulating lightweight slab for wall partitions, roof decking and the like. The low density and exceptional strength of the product gives a decking that is insulated, easy to erect, substantially fire-resistant, and permanent. The light weight lends itself well to the modern trend of construction where minimum supporting structures are required.

A particularly desirable feature of the invention is that the concrete can be readily sawed, drilled and worked with ordinary wood-working tools such as with which carpenter's and artisan's are acquainted. Thus the slab can be cut with a saw to provide tongue and groove joints for the assembling of the various panels into a monolithic structure. In this respect it will be noted that the novel concrete of this invention has a weight comparable to that of conventional woods used in construction. For example, the oven dried weight of balsa wood which is one of the lighter woods ranges from 7.5 to 12.5 pounds per cubic foot and the oven dried weight of pine and spruce which are one of the conventional construction woods ranges from 23 to 29 pounds per cubic foot. It can thus be seen that the novel concrete of this invention has a density that is conventional in construction operations and has handling characteristics with which the carpenters are familiar. It does not require any great training for one to be able to use the novel structure of this invention in substitution for the wood with which the carpenter is familiar. The additional advantage, of course, is that the novel concrete of this invention is substantially fire-resistant.

The composition has even greater advantage from an aesthetic standpoint in that the beads may be made of different colors and so enhance the general beauty of the concrete structure where such beauty is desired.

I claim:

1. A low density concrete composition having an oven dry density of 15–35 pounds per cubic foot, which comprises a lightweight aggregate phase of closed celled, multicellular expanded polymeric particles having a density of 1–10 pounds per cubic foot and a binder phase of hydraulic cement and surface active additive wherein the mix ratio of bag of cement (94 pounds) to cubic feet of polymeric particles is in a range of 1:2 to 1:8 and said binder phase contains entrained air in an amount of 13.5–60 percent by volume.

2. A low density concrete composition having an oven dry density of 15–35 pounds per cubic foot which comprises an aggregate phase of closed celled, multicellular expanded polystyrene beads having a density of 1–10 pounds per cubic foot and a binder phase of hydraulic cement, surface active additive in an amount of 0.01–1.0 percent by weight of the cement, and a hydrocarbon air entraining synergist in an amount of up to 2.0 percent by weight of the cement, wherein the mix ratio of bags of cement (94 pounds) to cubic feet of polystyrene beads is in a range of 1:2 to 1:8 and said binder phase contains entrained air in an amount of 13.5–60 percent by volume.

3. A composition capable of being molded and cured into a low density concrete having an oven dry weight of 15–35 pounds per cubic foot comprising a uniform suspension of a lightweight aggregate phase of closed celled, multicellular expanded polymeric particles having a density of 1–10 pounds per cubic foot and a binder phase of hydraulic cement, water, and surface-active additive, said binder phase containing entrained air in an amount of 13.5–60 percent by volume.

4. A composition capable of being curved into a low density concrete having an oven dry density of 15–35 pounds per cubic foot comprising a uniform suspension of a lightweight aggregate phase of closed celled multicellular expanded polystyrene beads having a density of 1–10 pounds per cubic foot in a binder phase of Portland cement, water, surface-active additive and air entraining synergist, said binder phase containing entrained air in an amount of 13.5–60 percent by volume.

5. A composition according to claim 3 wherein said binder phase contains surface-active additive in an amount of 0.01–1.0 percent by weight of the cement and air entraining synergist in an amount of up to 2.0 percent by weight of the cement.

6. A composition capable of being cured into a low density concrete having an oven dry density of 15–35 pounds per cubic foot comprising a uniform suspension of a lightweight aggregate phase of closed celled multicellular expanded polystyrene beads having a density of 1–10 pounds per cubic foot in a binder phase of hydraulic cement, water, surface-active additive in an amount of 0.01–1.0 percent by weight of cement, and hydrocarbon air entraining synergist in an amount of up to 2 percent by weight of the cement, said binder phase containing entrained air in an amount of 13.5–60 percent by volume.

7. A composition according to claim 5, wherein said surface-active additive is a sodium salt of formaldehyde-condensed naphthalene-sulfonic acid and said air entraining synergist is a thermoplastic resin of polymeric polynuclear hydrocarbons derived from petroleum cracking extract.

8. A composition according to claim 5 wherein said air entraining synergist is a naphthenic hydrocarbon.

References Cited by the Examiner

UNITED STATES PATENTS

| | | | |
|---|---|---|---|
| 2,797,201 | 6/1957 | Veatch et al. | 260—2.5 |
| 2,993,016 | 7/1961 | Sucetti | 260—29.4 |
| 3,021,291 | 2/1962 | Thiessen | 260—2.5 |
| 3,214,393 | 10/1965 | Sefton | 260—2.5 |

FOREIGN PATENTS 863,499  6/1960  Great Britain.

MURRAY TILLMAN, *Primary Examiner.*

M. FOELAK, *Assistant Examiner.*